(12) United States Patent
Chen et al.

(10) Patent No.: US 10,744,528 B2
(45) Date of Patent: Aug. 18, 2020

(54) ADJUSTABLE ULTRASONIC MICRO-JET NOZZLE ARRAY WITH MINIMAL QUANTITY LUBRICATION

(71) Applicant: Sichuan University, Chengdu, Sichuan (CN)

(72) Inventors: Ling Chen, Sichuan (CN); Wu Zhao, Sichuan (CN); Wei Jiang, Sichuan (CN); Hao Wan, Sichuan (CN); Qianmiao Zhou, Sichuan (CN); Xin Guo, Sichuan (CN); Miao Yu, Sichuan (CN); Kai Zhang, Sichuan (CN); Lin Du, Sichuan (CN); Zeyuan Yu, Sichuan (CN); Nianhan Wu, Sichuan (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 16/686,175

(22) Filed: Nov. 17, 2019

(65) Prior Publication Data
US 2020/0122183 A1 Apr. 23, 2020

Related U.S. Application Data

(63) Continuation of application No. PCT/CN2019/072185, filed on Jan. 17, 2019.

(30) Foreign Application Priority Data

Oct. 19, 2018 (CN) .......................... 2018 1 1221308

(51) Int. Cl.
*B05B 17/06* (2006.01)
*B23C 5/28* (2006.01)
(Continued)

(52) U.S. Cl.
CPC .......... *B05B 17/0661* (2013.01); *B05B 14/00* (2018.02); *B05B 17/0646* (2013.01);
(Continued)

(58) Field of Classification Search
CPC ...... B05B 17/0607–0684; B05B 14/00; B05B 14/10; B05B 1/14; B05B 1/202; B23C 5/28; B23C 2250/12
(Continued)

(56) References Cited

U.S. PATENT DOCUMENTS

| 4,667,877 A * | 5/1987 | Yao ..................... B05B 17/0615 239/102.2 |
| 5,624,608 A * | 4/1997 | Ching ................... B05B 7/0012 261/30 |

(Continued)

FOREIGN PATENT DOCUMENTS

| CN | 104741279 A | 7/2015 |
| CN | 105056624 A | 11/2015 |

(Continued)

*Primary Examiner* — Cody J Lieuwen
(74) *Attorney, Agent, or Firm* — Wayne & Ken, LLC; Tony Hom

(57) ABSTRACT

Disclosed is an adjustable ultrasonic micro-jet nozzle array with minimal quantity lubrication, relating to cooling of machining. The array-type nozzle includes an inlet conduit, a recycle conduit and a cooling body having a microjet ejection assembly and a recycling assembly. The cooling body includes a microjet ejection chamber which is closed. The inlet conduit is provided at a top of the cooling body and communicates with the microjet ejection chamber. The recycle conduit is located in the microjet ejection chamber, and connects the recycling assembly and an external vacuum machine. The adjustable ultrasonic micro jet nozzle array of the present invention has the advantages of simple structure and being convenient to use. A flow rate of trace cooling fluid is increased to improve the cooling and lubricating effect. A cooling fluid mist is recycled by the vacuum suction to reduce the consumption of the lubricating fluid while ensuring the cooling effect.

7 Claims, 5 Drawing Sheets

(51) Int. Cl.
  *B05B 14/00*    (2018.01)
  *B05B 17/00*    (2006.01)
  *B05B 1/14*     (2006.01)

(52) U.S. Cl.
  CPC .............. *B23C 5/28* (2013.01); *B05B 1/14* (2013.01); *B23C 2250/12* (2013.01)

(58) Field of Classification Search
  USPC .............................................. 239/102.2, 120
  See application file for complete search history.

(56)         References Cited

U.S. PATENT DOCUMENTS 5,836,515 A  * 11/1998  Fonzes ................ B05B 17/0615
                                                239/102.2
  2003/0080160 A1* 5/2003  Ohnishi ............... B01J 19/0046
                                                222/420
  2007/0290068 A1* 12/2007 Lu ........................ B05B 7/0012
                                                239/102.2
  2014/0224899 A1* 8/2014  Jeon ..................... B05B 7/0416
                                                239/120
  2016/0067368 A1* 3/2016  Gschwind ............... A47F 3/001
                                                239/4

FOREIGN PATENT DOCUMENTS

CN      105479255 A      4/2016
  CN      206393348 U      8/2017
  CN      108906463 A      11/2018
  JP      11123357 A       5/1999
  JP      2006205100 A     8/2006
  WO      2006070839 A     7/2006

* cited by examiner

ADJUSTABLE ULTRASONIC MICRO-JET NOZZLE ARRAY WITH MINIMAL QUANTITY LUBRICATION

CROSS-REFERENCE TO RELATED APPLICATIONS

This application is a continuation of International Patent Application No. PCT/CN2019/072185, filed on Jan. 17, 2019, which claims the benefit of priority from Chinese Patent Application No. 201811221308.3, filed on Oct. 19, 2018. The contents of the aforementioned applications, including any intervening amendments thereto, are incorporated herein by reference in its entirety.

TECHNICAL FIELD

The present application relates to cooling for machining, and more particularly to an adjustable ultrasonic micro jet nozzle array with minimal quantity lubrication.

BACKGROUND OF THE INVENTION

During mechanical cutting, cutting zones are subjected to high temperatures and high pressures. Cooling lubrication achieved by pouring is adopted for cooling, but the cooling effect thereof is not obvious, since cutting fluids have a low penetration efficiency, especially during high-speed machining.

Thus, the conventional cooling lubrication method wastes a large amount of cutting fluids, and the discharged waste liquids cause the environmental pollution. Moreover, element additives such as sulfur, phosphorus and chlorine in the cutting fluid may do harm to human bodies. A new green processing technique for improving production and ecological environment is urgently needed to protect the environment and reduce production cost.

SUMMARY OF THE INVENTION

An object of the application aims to provide an adjustable ultrasonic micro jet nozzle array with minimal quantity lubrication, which has a reasonable design, simple structure, good cooling and lubrication effect, and less consumption of lubricating fluids. The impact of cooling oil mist on the human body and the environment is reduced while the cooling effect is maintained.

The above object of the application can be achieved by the following technical solutions.

The application provides an adjustable ultrasonic micro jet nozzle array with minimal quantity lubrication, comprising an inlet conduit, a recycle conduit and a cooling body having a microjet ejection assembly and a recycling assembly. The cooling body comprises a microjet ejection chamber which is closed. The inlet conduit is provided at a top of the cooling body and is in communication with the microjet ejection chamber. The recycle conduit is located in the microjet ejection chamber, and connects the recycling assembly and an external vacuum machine.

Moreover, the array-type nozzle with ultrasonic oscillations for minimal quantity lubrication provided in the application may have the following additional technical features.

In some embodiments, the cooling body comprises a first cover, a bottom plate and sidewalls which form the microjet ejection chamber.

The microjet ejection assembly and the recycling assembly adjacent to each other are respectively located on the sidewalls.

In some embodiments, the microjet ejection assembly comprises a cooling fluid ejection body, a piezoelectric ceramic body and a plurality of microjet nozzles with microjet holes. A plurality of first ejection holes spaced apart are arranged on the cooling fluid ejection body. A plurality of second ejection holes spaced apart are arranged on the piezoelectric ceramic body.

The microjet nozzles, the first ejection holes and the second ejection holes have the same number and have a one-to-one correspondence. The microjet nozzles are sequentially inserted into the second ejection holes and the first ejection holes.

In some embodiments, the microjet nozzles are distributed as a rectangular array. The microjet nozzles comprise center nozzle provided at a center of the rectangular array and focusing nozzles located around the center nozzle. The focusing nozzles are angled to allow a cooling fluid to be ejected toward a central axis of the rectangular array.

In some embodiments, each of the microjet nozzles comprises a communicating section and an ejecting section. Respective communicating sections are sequentially inserted in respective second ejection holes and respective first ejection holes. The ejecting section is located on a side of the piezoelectric ceramic body away from the cooling fluid ejection body.

In some embodiments, inner walls of the first and second ejection holes are coated with a zinc oxide or graphene coating.

In some embodiments, a zinc oxide or graphene coating is respectively provided on inner walls of the microjet holes of the microjet nozzles.

In some embodiments, the recycling assembly comprises a particle recycling body and a cover plate. The particle recycling body comprises a suction panel and a recycling chamber opening at one side. The suction panel is a bottom wall of the recycling chamber. The cover plate covers the recycling chamber. The suction panel is provided with a plurality of particle recycling holes. The cover plate is provided with a through hole. One end of the recycle conduit is inserted into the through hole and communicates with the recycling chamber, and the other end of the recycle conduit is connected to the external vacuum machine.

In some embodiments, two microjet ejection assemblies and two recycling assemblies are provided to form the microjet ejection chamber. The two microjet ejection assemblies are oppositely arranged. The two recycling assemblies are oppositely arranged. The microjet ejection assembly and the recycling assembly are arranged to be adjacent to each other.

In some embodiments, the recycle conduit comprises a first communication tube and a second communication tube that are in communication with each other. The first communication tube and the second communication tube form a T-shaped structure. Two ends of the first communication tube respectively communicate with the two recycling assemblies. The second communication tube penetrates the top of the cooling body and is connected to the external vacuum machine.

The beneficial effects of the application are as follows.

The adjustable ultrasonic micro-jet nozzle array has the advantages of a reasonable design and simple structure and strong practicability, and is convenient to use. The mode with input and suction functions is adopted to increase a flow rate of the cooling trace fluid and improve the cooling and lubricating effect, so the array-type nozzle has a good cooling effect. The cooling fluid mist is sucked by vacuum to be recycled, which reduces the consumption of the lubricating fluid. Moreover, the impact of the cooling oil mist on the human body and the environment is reduced while the cooling effect is maintained. The particle size of the atomized particles is reduced to improve the atomization effect.

BRIEF DESCRIPTION OF THE DRAWINGS

The accompanying drawings used in the embodiments will be briefly described below for better illustration of the embodiments of the application. It should be understood that the following drawings only illustrate part of embodiments of the application, and are not intended to limit the scope of the application. Other drawings based on the following drawings can be made by those skilled in the art without creative work.

Figure 1:
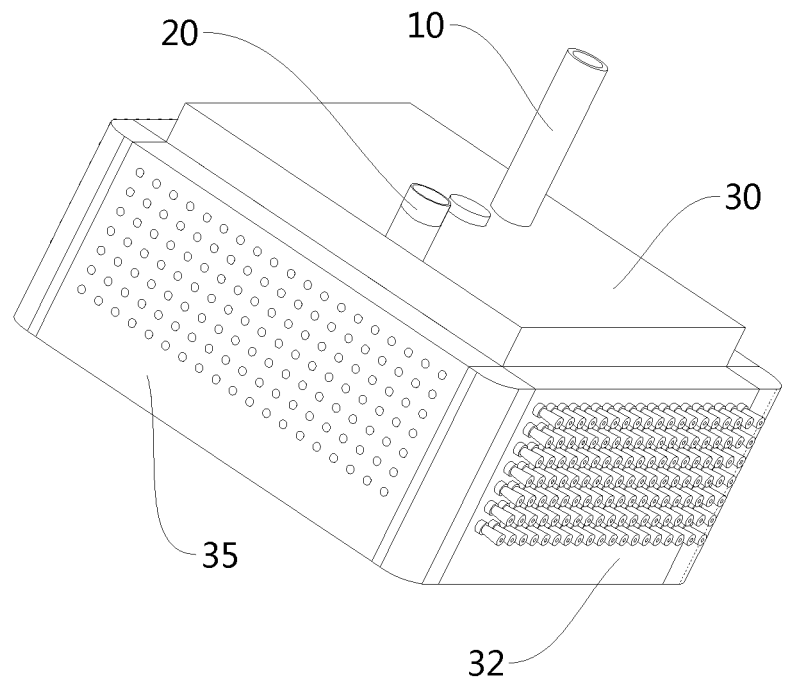
FIG. 1 is a schematic diagram of an adjustable ultrasonic micro jet nozzle array with minimal quantity lubrication according to an embodiment of the present invention.

In the drawings: 100—adjustable ultrasonic micro-jet nozzle array with minimal quantity lubrication; 10—inlet conduit; 20—recycle conduit; 21—first communication tube; 22—second communication tube; 30—cooling body; 302—first cover; 31—microjet ejection chamber; 32—microjet ejection assembly; 323—cooling fluid ejection body; 324—first ejection hole; 325—piezoelectric ceramic body; 326—second ejection hole; 327—microjet nozzle; 3275—focusing nozzle; 3276—center nozzle; 328—microjet hole; 3273—communicating section; 3274—ejecting section; 35—recycling assembly; 352—particle recycling body; 353—suction panel; 354—particle recycling hole; 355—recycling chamber; 356—cover plate; 357—through hole; and 40—milling cutter.

DETAILED DESCRIPTION OF EMBODIMENTS

The technical solutions of the present invention will be clearly and completely described in conjunction with the accompanying drawings and the embodiments to make the objects, technical solutions and the advantages of the present invention more clear. Obviously, the described embodiments are only some embodiments of the present invention, which are bot intended to limit the scope of the present invention.

Therefore, the following embodiments in conjunction with the accompanying drawings are described in detail merely as exemplary embodiments, and are not intended to limit the scope of the application. Other embodiments obtained by those skilled in the art based on the embodiments of the application without creative efforts shall fall within the scope of the application.

It should be noted that similar reference numerals and letters in the following drawings refer to similar items, so such items are not necessary to be defined in the subsequent drawings.

It should be noted that terms "first", "second", "third" and the like are used merely for separate description, and are not to be construed as indicating or implying relative importance.

In the present invention, it should be further noted that, unless specified, terms "provide" and "connect" should be understood broadly. For example, "connect" may result in a fixed connection, a detachable connection, or an integrated configuration of elements. The elements may be connected mechanically or electrically, or directly connected or indirectly connected through an intermediate medium. Alternatively, two elements may be in communication or interact with each other unless specified. For the skilled in the art, the specific meaning of the above terms in the present invention can be understood according to specific conditions.

The embodiments of the application are described in detail below with reference to the accompanying drawings, but the application can be implemented in various embodiments as illustrated and covered by the appended claims.

EXAMPLE

Figure 2:
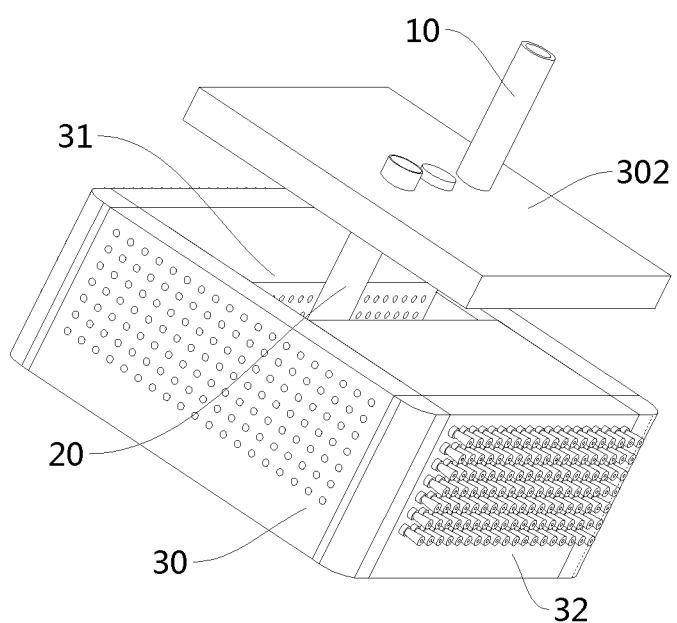
FIG. 2 is a schematic diagram showing an open state of the adjustable ultrasonic micro jet nozzle array with minimal quantity lubrication according to an embodiment of the present invention.
Figure 3:
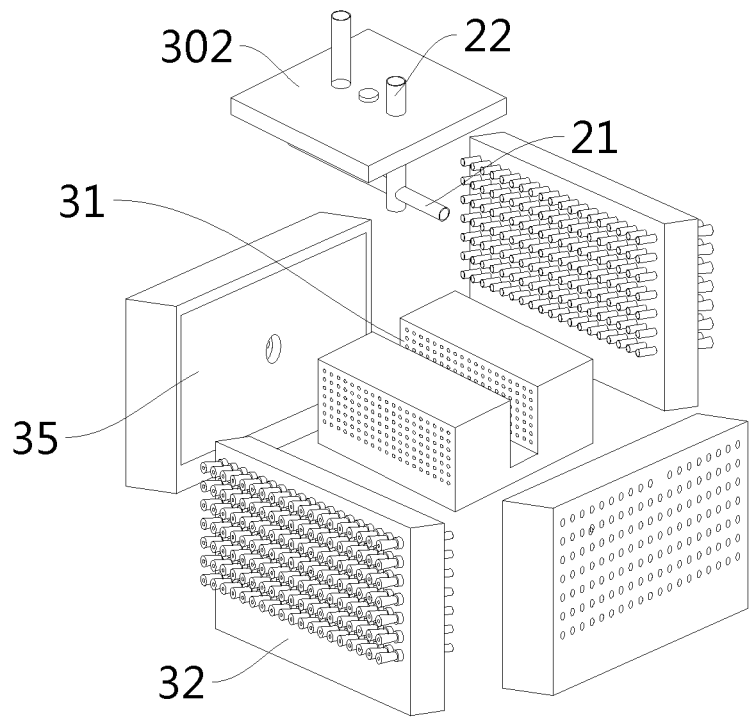
FIG. 3 is an exploded view of adjustable ultrasonic micro jet nozzle array with minimal quantity lubrication according to an embodiment of the present invention.

As shown in FIGS. 1-3, the adjustable ultrasonic micro-jet nozzle array with minimal quantity lubrication 100 includes an inlet conduit 10, a recycle conduit 20, and a cooling body 30. The cooling body 30 has a microjet ejection chamber 31 which is closed. A cooling fluid passes through the inlet conduit 10 and flows to a microjet ejection assembly 32. Based on a microjet cooling principle, the cooling fluid with a certain pressure is input into the inlet conduit 10, and the cooling body 30 which can generate microjets reduces the particle size of the cooling fluid particles and ejects cooling fluid with a strong atomization effect.

During the ejection, a plurality of microjet nozzles 327 are angled to allow the cooling fluid to be ejected to a designated focal spot on cutting tools, that is, all the microjet nozzles 327 eject the cooling fluid gathered at a central point.

The cooling body 30 is provided with a recycling assembly 35 which connects to one end of the recycle conduit 20, and the other end of the recycle conduit 20 is connected to an external vacuum machine, so as to recycle the dispersed atomized cooling fluid particles. Therefore, a better cooling effect is achieved while excess cooling fluid is recycled for re-utilization which is beneficial to environmental protection and green development.

The adjustable ultrasonic micro-jet nozzle array with minimal quantity lubrication 100 will be described in detail below about specific structures and corresponding relationships of respective components.

As shown in FIGS. 2-3, the cooling body 30 is a rectangular frame. The cooling body 30 is provided with the microjet ejection assembly 32 and the recycling assembly 35 which are arranged to be adjacent to each other. The cooling body 30 is provided with the microjet ejection chamber 31 which is closed inside and communicates with the microjet ejection assembly 32.

The inlet conduit 10 is provided at a top of the cooling body 30. The external cooling fluid enters the microjet ejection chamber 31 by passing through the inlet conduit 10, then is ejected in the form of micro-atomized particles under the action of the microjet ejection assembly 32.

The recycling assembly 35 is connected to the external vacuum machine through the recycle conduit 20 which penetrates the microjet ejection chamber 31. Under the action of the vacuum machine, the recycling assembly 35 and the recycle conduit 20 recycle the micro-atomized particles for post-processing and reuse.

Specifically, the cooling body 30 includes a first cover 302, a bottom plate and sidewalls. The first cover 302 covers the microjet ejection chamber 31. The first cover 302, the bottom plate and the sidewalls are enclosed to form the microjet ejection chamber 31 which is configured to accommodate the cooling fluid.

The microjet ejection assembly 32 and the recycling assembly 35 are respectively located on the sidewalls. The microjet ejection assembly 32 ejects the cooling fluid, and the recycling assembly 35 recycles excess atomized particles. In this embodiment, the microjet ejection assembly 32 and the recycling assembly 35 are arranged adjacent to each other for cooling tools during machining, and saving the cooling fluid while ensuring a good cooling effect.

Figure 4:
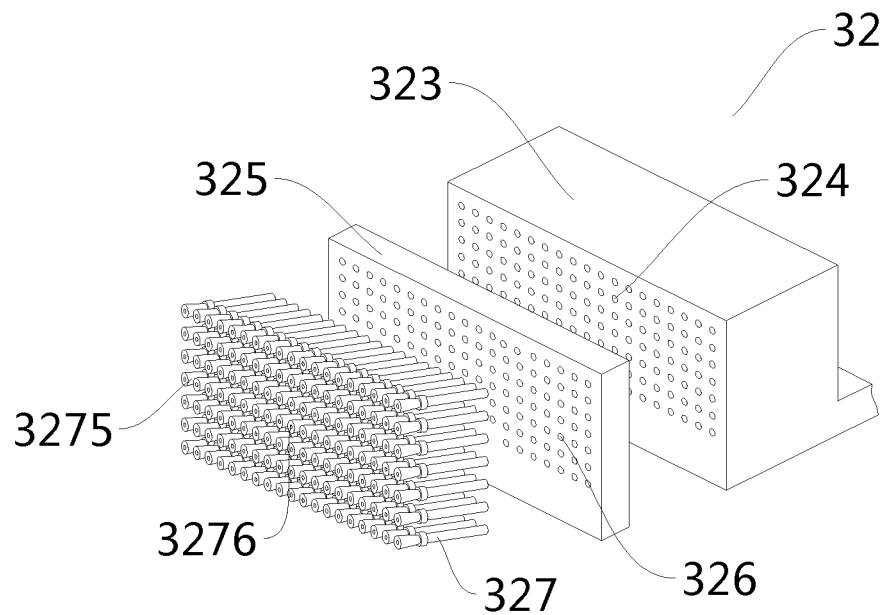
FIG. 4 is an exploded view of a microjet ejection assembly of adjustable ultrasonic micro jet nozzle array with minimal quantity lubrication in FIG. 3.

As shown in FIG. 4, the microjet ejection assembly 32 includes a cooling fluid ejection body 323, a piezoelectric ceramic body 325, and a plurality of microjet nozzles 327. The cooling fluid ejection body 323 is adjacent to the microjet ejection chamber 31. The piezoelectric ceramic body 325 is located on an outer side with respect to the cooling fluid ejection body 323. A plurality of first ejection holes 324 spaced apart are arranged on the cooling fluid ejection body. A plurality of second ejection holes 326 spaced apart are arranged on the piezoelectric ceramic body. The microjet nozzles, the first ejection holes and the second ejection holes have the same number and have a one-to-one correspondence. The microjet nozzles 327 are provided with microjet holes 328. The microjet nozzles 327 are sequentially inserted into the second ejection holes 326 of the piezoelectric ceramic body 325 and the first ejection holes 324 of the cooling fluid ejection body 323 in one-to-one correspondence, so that the microjet nozzles communicate with the microjet ejection chamber 31.

Figure 5:
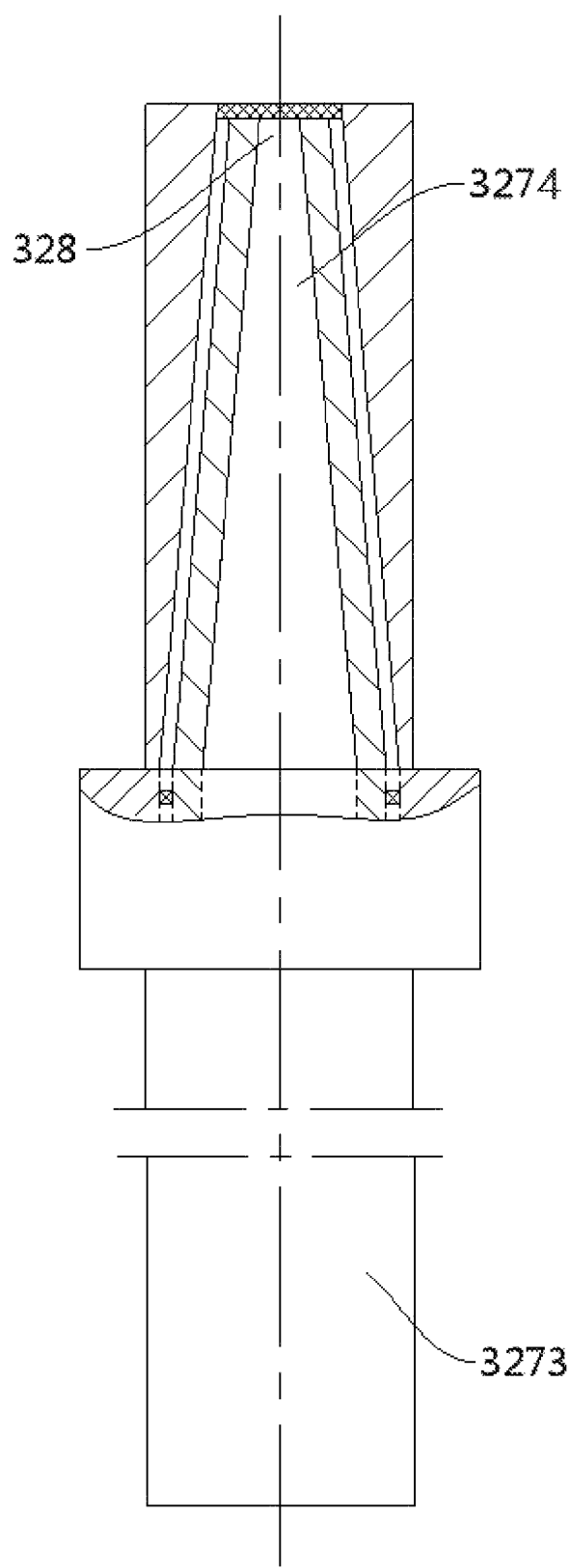
FIG. 5 is a cross-sectional view of a microjet nozzle of the microjet ejection assembly in FIG. 4.

As shown in FIG. 5, specifically, each of the microjet nozzles 327 includes a communicating section 3273 and an ejecting section 3274. Respective communicating sections 3273 are configured to connect the cooling fluid ejection body 323 and the piezoelectric ceramic body 325, and communicates the microjet ejection chamber 31 and the microjet holes 328 of the microjet nozzles 327. The communicating sections 3273 are sequentially inserted into the second ejection holes 326 and the first ejection holes 324. The ejecting section 3274 is configured to eject the cooling fluid toward machining tools for cooling. For this reason, the ejecting section 3274 is located on a side of the piezoelectric ceramic body 325 away from the cooling fluid ejection body 323.

Each of the microjet nozzles 327 has an opening which is pinhole-like. A zinc oxide or graphene coating is respectively provided on inner walls of the microjet holes 328 of the microjet nozzles 327 to enhance cooling fluid and reduce the particle size of the atomized particles.

In some embodiments, the zinc oxide and graphene coating have a thickness of 0.02 mm. Due to the hydrophobicity of the zinc oxide or graphene coating, the atomized cooling fluid is reduced in particle sizes, thereby improving atomization effect.

In some embodiments, the microjet nozzles 327 are distributed as a rectangular array. The second ejection holes 326 of the piezoelectric ceramic body 325 and the first ejection holes 324 of the cooling fluid ejection body 323 have the same diameter of 0.4 mm. The distance between two installed adjacent nozzles is 1 mm in horizontal and vertical directions.

In some embodiments, the microjet nozzles 327 includes focusing nozzles 3275 and a center nozzle 3276. The center nozzle 3276 is provided at a center of the rectangular array, and the cooling fluid ejected by the center nozzle 3276 is located at the extending line of the central axis of the microjet hole 328 of the center nozzle. The focusing nozzles 3275 are distributed around the center nozzle 3276, and the focusing nozzles 3275 are angled, so that the cooling fluid is ejected by the focusing nozzles 3275 towards the extending line of the central axis of the microjet hole 328 of the central nozzle 3276, that is, the focusing nozzles 3275 are angled to allow the cooling fluid to be ejected towards the central axis of the rectangular array. Each of the focusing nozzles 3275 provided herein has a fixed position and installing angle, so that all nozzles with such ejection angles eject toward a designated focal spot on cutting tools. The ejection fluids ejected from the microjet nozzles 327 gather at the extending line of the central axis of the rectangular array.

In order to consume less cutting fluid without reducing processing quality in machining, new cooling and lubricating methods are successively developed, such as dry cutting, low-temperature cold air, liquid nitrogen cooling, gas jet cooling, minimal quantity lubrication, water vapor cooling and trace oil-film on water drops. It has been demonstrated that all these methods have better cooling effect than the conventional pouring method of cooling and lubrication.

This embodiment provides the adjustable ultrasonic micro-jet nozzle array with minimal quantity lubrication 100. Based on the microjet cooling principle, the jet is formed by the fluid surrounding the jet holes, and no additional flow source is needed. The microjet is mainly formed by the following two methods. One method is to form a jet actuator by opening tiny holes on one side of the closed cavity. During the operation, vibration will be generated on the opposite side of the tiny hole, and the external fluid continuously enters and exits the cavity through the tiny hole, thereby forming the microjet. The other method is to directly place a vibrating membrane in the fluid, and the jet is formed along the normal direction of the membrane as long as the membrane vibrates with enough amplitude.

In some embodiments, the cooling fluid added with trace plant oils and trace water is atomized by the action of compressed air and the special nozzle. The atomized cooling fluid forms a plurality of tiny droplets in which a thin oil film is formed on the surface. These droplets together with the compressed air are exited and enhanced to form microjets, and then are ejected at a high speed to a machining surface of workpieces and a surface of machining tools. A small amount of water remaining on the surface of the workpiece will be evaporated or removed by the cutting heat generated during the cutting process, while the retained trace oil film can function as lubrication and rust prevention. Due to the expansion and hydrophilicity, the oil film retains on the machining surface of workpieces and the surface of the machining tools to achieve good lubrication and cooling effect, thereby improving cooling effect, saving cooling fluid and protecting environment and health.

In the embodiment, in order to achieve a better hydrophobic interaction, inner walls of the first ejection holes 324 of the cooling fluid ejection body 323 and the second ejection holes 326 of the piezoelectric ceramic body 325 are applied with the zinc oxide or graphene coating to reduce the size of the atomized particles. Since the cooling fluid is jetted under pressure and the piezoelectric ceramic vibrates under ultrasonic, the cooling fluid is motivated and enhanced to form the microjet, facilitating the merging of water and oils, and reducing particle size of the atomized particles, thereby improving the atomization effect.

Figure 6:
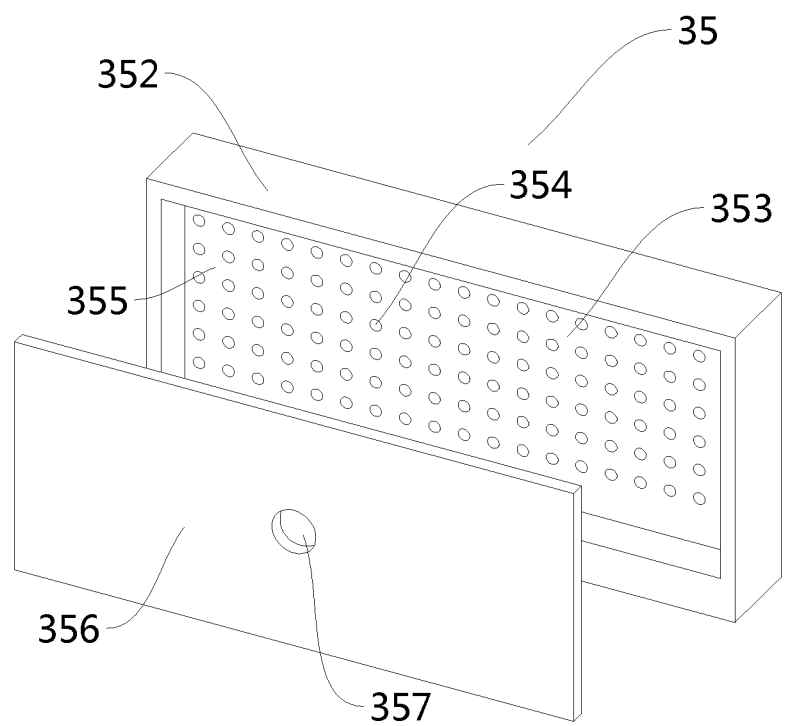
FIG. 6 is an exploded view of a recycling assembly of adjustable ultrasonic micro jet nozzle array with minimal quantity lubrication in FIG. 3.

As shown in FIG. 6, the recycling assembly 35 includes a particle recycling body 352 and a cover plate 356. The particle recycling body 352 includes a suction panel 353 and a recycling chamber 355 opens at one end. The suction panel 353 is a bottom wall of the recycling chamber 355, and the cover plate 356 is provided for covering the recycling chamber 355. The suction panel 353 is provided with a plurality of particle recycling holes 354. The cover plate 356 is provided with a through hole 357. A vacuum machine provided at a side of the cover plate 356 can suck the atomized particles to the recycling chamber 355 via the particle recycling holes 354 of the suction panel 353, then to the through hole 357 for recycling.

In some embodiments, the recycle conduit 20 is tubular, and one end of the recycle conduit is inserted into the through hole 357, and the other end of the recycle conduit is connected to the external vacuum machine, so that the recycling chamber 355 communicates with the vacuum machine for recycling excess atomized fluid particles. The cooling fluid mist is recycled through suction of vacuum to reduce the consumption of the lubricating fluid and ensure the cooling effect. At the same time, the influence of the cooling oil mist on the human body and the environment is reduced.

The adjustable ultrasonic micro-jet nozzle array with minimal quantity lubrication 100 provided herein adopts a mode with output and suction functions to increase a flow rate of the lubricating trace fluid and simultaneously improve the cooling and lubrication effect.

In the embodiment, two microjet ejection assemblies 32 and two recycling assemblies 35 are provided to form the microjet ejection chamber 31, where the two microjet ejection assemblies 32 are oppositely arranged, and the two recycling assemblies 35 are oppositely arranged, and the microjet ejection assembly 32 and the recycling assembly 35 are arranged to be adjacent to each other.

The inlet conduit 10 is connected to the microjet ejection chamber 31 that is connected to the two microjet ejection assemblies 32, such that the microjet nozzles 327 of each of the microjet ejection assemblys 32 communicate with the microjet ejection chamber 31. The cover plate 356 of each of the two recycling assemblies 35 is provided with the through hole 357, and is connected to the external vacuum machine through the recycle conduit 20.

Figure 7:
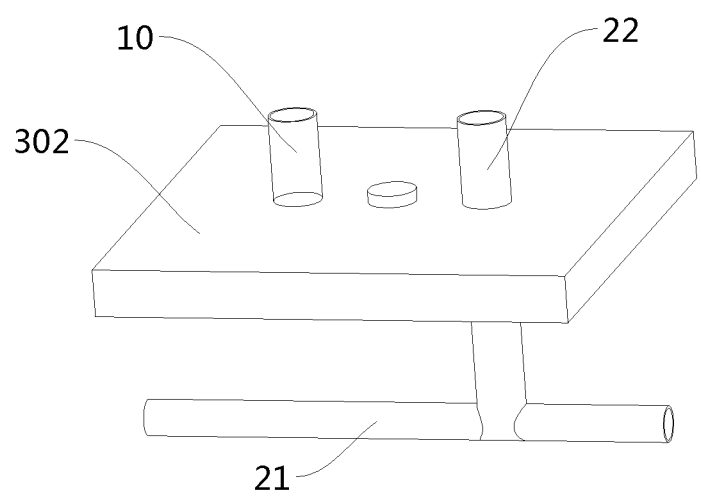
FIG. 7 is a schematic diagram showing a connection of a first cover, an inlet conduit and a recycle conduit.

FIG. 7 schematically shows the assembly of the first cover 302, the recycle conduit 20 and the inlet conduit 10.

In some embodiments, the recycle conduit 20 includes a first communication tube 21 and a second communication tube 22 that are in communication with each other. The first communication tube 21 and the second communication tube 22 form a T-shaped structure. Two ends of the first communication tube 21 respectively communicate with the recycling chambers 355 of the two recycling assemblies 35. The second communication tube 22 penetrates the top of the cooling body 30 and is connected to the external vacuum machine.

In some embodiments, the inlet conduit 10 and the recycle conduit 20 are made of copper, and the microjet ejection assembly 32 and the recycling assembly 35 both are formed by piezoelectric ceramic sheets. The cooling fluid for adjustable ultrasonic micro-jet nozzle array with minimal quantity lubrication 100 is inputted under a certain pressure. Based on the principle of microjet, the microjet ejection assembly 32 enhances and motivates the ejection and atomization of the cooling fluid.

Figure 8:
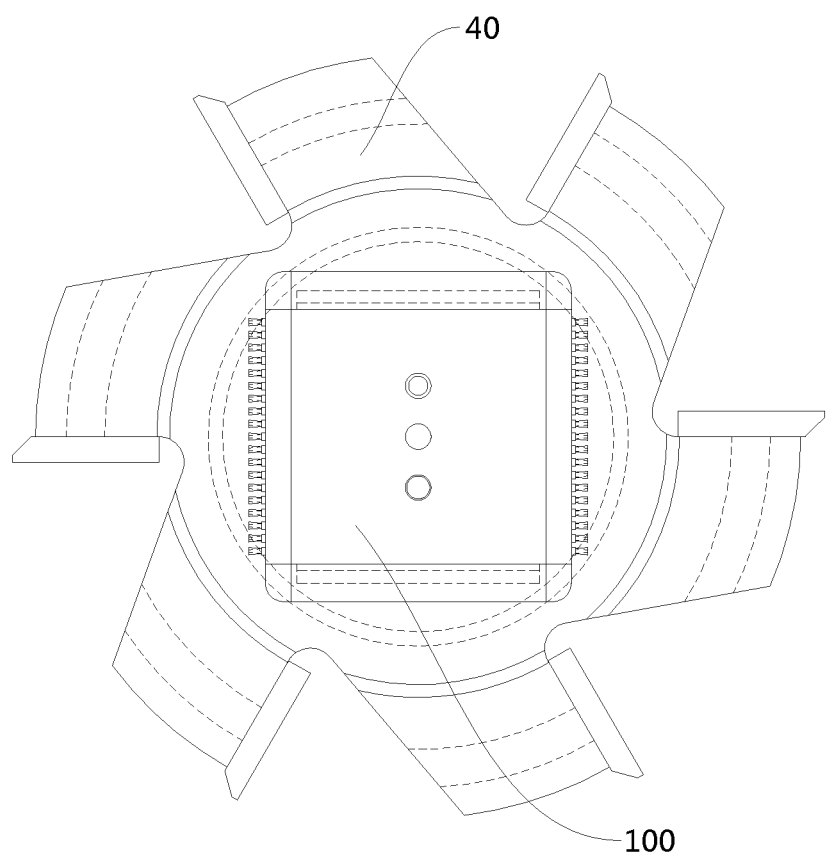
FIG. 8 schematically shows adjustable ultrasonic micro jet nozzle array with minimal quantity lubrication is mounted on a milling cutter.

As shown in FIG. 8, the adjustable ultrasonic micro-jet nozzle array with minimal quantity lubrication 100 is installed in the milling cutter 40, and rotates around a rotation axis of the milling cutter 40, thereby facilitating the adjustment of the ejection concentration point of the adjustable ultrasonic micro-jet nozzle array with minimal quantity lubrication 100, so that the ejection point is focused at a desired cooling position where the tool is in contact with the workpiece, thereby achieving the desired cooling effect.

The adjustable ultrasonic micro-jet nozzle array with minimal quantity lubrication 100 provided in the application has the following beneficial effects.

The adjustable ultrasonic micro-jet nozzle array of the present invention has the advantages of simple structure and being convenient to use. The mode with output and suction functions is adopted to increase the flow rate of the trace cooling fluid, as well as to improve the cooling and lubricating effect. The cooling fluid mist is recycled by vacuum suction to reduce the consumption of the lubricating fluid. the influence of the cooling oil mist on the human body and the environment is reduced while the cool effect is maintained. Since the cooling fluid is jetted under pressure and the piezoelectric ceramic vibrates under ultrasonic, the cooling fluid is motivated and enhanced to form the microjet, facilitating the merging of water and oils, and reducing the particle size of the atomized particles. The microjet nozzle has an opening which is pinhole-like, and the zinc oxide or graphene coating which is hydrophobic is applied to reduce the particle size of the atomized particles and improve the atomization effect.

It should be noted that technical features in the embodiments of the present invention may be combined with each other without conflict.

The above is only an exemplary embodiment of the present invention, and is not intended to limit the scope of the present invention. Any modifications, variations, equivalent substitutions and improvements made by those skilled in the art within the spirit and scope of the present invention shall fall within the scope of the present invention.

What is claimed is:

1. An adjustable ultrasonic micro-jet nozzle array with minimal quantity lubrication, comprising:
   an inlet conduit;
   a recycle conduit; and
   a cooling body having a microjet ejection assembly and a recycling assembly;
   wherein the cooling body comprises a microjet ejection chamber which is closed; the inlet conduit is provided at a top of the cooling body and communicates with the microjet ejection chamber; and the recycle conduit is located in the microjet ejection chamber, and connects the recycling assembly and an external vacuum machine; and
   wherein two microjet ejection assemblies and two recycling assemblies are provided to form the microjet ejection chamber; the two microjet ejection assemblies are oppositely arranged, and the two recycling assemblies are oppositely arranged; and each of the two microjet ejection assemblies and each of the two recycling assemblies are arranged to be adjacent to each other.

2. The adjustable ultrasonic micro-jet nozzle array of claim 1, wherein the recycle conduit comprises a first communication tube and a second communication tube that are in communication with each other; the first communication tube and the second communication tube form a T-shaped structure; two ends of the first communication tube respectively communicate with the two recycling assemblies; and the second communication tube penetrates the top of the cooling body and is connected to the external vacuum machine.

3. An adjustable ultrasonic micro-jet nozzle array with minimal quantity lubrication, comprising:
- an inlet conduit;
- a recycle conduit; and
- a cooling body having a microjet ejection assembly and a recycling assembly;
- wherein the cooling body comprises a microjet ejection chamber which is closed; the inlet conduit is provided at a top of the cooling body and communicates with the microjet ejection chamber; and the recycle conduit is located in the microjet ejection chamber, and connects the recycling assembly and an external vacuum machine;
- the cooling body comprises a first cover, a bottom plate and sidewalls which form the microjet ejection chamber;
- the microjet ejection assembly and the recycling assembly adjacent to each other are respectively located on the sidewalls;
- the microjet ejection assembly comprises a cooling fluid ejection body, a piezoelectric ceramic body, and a plurality of microjet nozzles with microjet holes; a plurality of first ejection holes spaced apart are arranged on the cooling fluid ejection body; and a plurality of second ejection holes spaced apart are arranged on the piezoelectric ceramic body; and
- the microjet nozzles, the first ejection holes and the second ejection holes have the same number, and have a one-to-one correspondence; and the microjet nozzles are sequentially inserted into the second ejection holes and the first ejection holes.

4. The adjustable ultrasonic micro-jet nozzle array of claim 3, wherein the microjet nozzles are distributed as a rectangular array; the microjet nozzles comprise a center nozzle provided at a center of the rectangular array and focusing nozzles located around the center nozzle; and the focusing nozzles are angled to allow a cooling fluid to be ejected toward a central axis of the rectangular array.

5. The adjustable ultrasonic micro-jet nozzle array of claim 3, wherein each of the microjet nozzles comprises a communicating section and an ejecting section; respective communicating sections are sequentially inserted in respective second ejection holes and respective first ejection holes; and the ejecting section is located on a side of the piezoelectric ceramic body away from the cooling fluid ejection body.

6. The adjustable ultrasonic micro-jet nozzle array of claim 5, wherein inner walls of the first and second ejection holes are coated with a zinc oxide or graphene coating.

7. The adjustable ultrasonic micro-jet nozzle array of claim 5, wherein a zinc oxide or graphene coating is respectively provided on inner walls of the microjet holes of the microjet nozzles.

* * * * *